United States Patent [19]
Henzel

[11] Patent Number: 5,141,242
[45] Date of Patent: Aug. 25, 1992

[54] WHEELCHAIR HANDLE BAR MECHANISM

[76] Inventor: Valerie A. Henzel, 23001 Firwood, East Detroit, Mich. 48021

[21] Appl. No.: 627,256

[22] Filed: Dec. 14, 1990

[51] Int. Cl.⁵ .............................................. B62K 15/00
[52] U.S. Cl. ........................... 280/304.1; 297/DIG. 4; 74/551.1
[58] Field of Search ............... 280/304.1, 250.1, 242.1, 280/47.4, 47.38, 47.34; 74/551.1; 297/DIG. 4

[56] References Cited

U.S. PATENT DOCUMENTS

| | | | |
|---|---|---|---|
| 1,591,529 | 7/1926 | Guerber | 280/47.4 |
| 3,953,054 | 4/1976 | Udden et al. | 280/250.1 |
| 4,280,731 | 7/1981 | Pitts et al. | 297/DIG. 4 X |
| 4,415,177 | 11/1983 | Hale et al. | 297/DIG. 4 X |
| 4,415,202 | 11/1983 | Pew | 297/217 |
| 4,708,357 | 11/1987 | Soderbaum | 280/304.1 |
| 4,759,562 | 7/1988 | Vinyard et al. | 280/304.1 |
| 4,852,697 | 8/1989 | Kulik | 280/304.1 X |
| 4,865,344 | 7/1989 | Romero, Sr. et al. | 280/255 |
| 5,020,815 | 6/1991 | Harris et al. | 280/250.1 X |

*Primary Examiner*—Charles A. Marmor
*Assistant Examiner*—Kevin Hurley

*Attorney, Agent, or Firm*—Peter D. Keefe

[57] ABSTRACT

A wheelchair guidance system connectable to a conventional wheelchair for permitting the person guiding the wheelchair to stand beside the disabled person in the wheelchair as he or she guides movement of the wheelchair. The wheelchair guidance system according to the present invention is composed of a handle-bar and a brake mechanism. The handle-bar is composed of three portions, a first portion which clamps to the frame of the wheelchair at the rear thereof, a second portion bent at 90 degrees to the first portion so as to generally follow along one of the armrests of the wheelchair, and a third portion which is bent at 90 degrees outwardly from the armrest so as to form a handle member that may be gripped by a person who guides movement of the wheelchair. Preferably, the third portion of the handle-bar is pivotally connected to the second portion of the handle-bar. The brake mechanism includes at least one hand-brake control provided on the third portion of the handle-bar so that the person guiding movement of the wheelchair can effect stopping of the wheelchair without difficulty.

18 Claims, 2 Drawing Sheets

WHEELCHAIR HANDLE BAR MECHANISM

BACKGROUND OF THE INVENTION

1. Field of the Invention

The present invention is related to wheelchairs for disabled persons, and more particularly to a wheelchair guidance system which is connectable to a conventional wheelchair to thereby enable the able-bodied person who is guiding movement of the wheelchair to do so at the side of the disabled person, rather than behind him or her, as is the conventional manner of wheelchair guidance.

2. Description of the Prior Art

Wheelchair devices to provide conveyance of disabled persons are well known in the prior art. Wheelchairs have in common a frame, a seat (along with a seat back) connected to the frame for the disabled person to sit upon, two large rear wheels connected to the frame for directly supporting the weight of the disabled person, two front wheels swivelably mounted to the frame, support structures mounted to the frame for supporting the arms and legs of the disabled person, and two spaced apart grips connected to the frame at the rear of the wheelchair for being grasped by the person who guides movement of the wheelchair. One grip is provided for each of the left and right hands of the person guiding the wheelchair to thereby enable the person guiding movement of the wheelchair to push, pull and steer by applying selective forces to the grips via his or her hands. Thusly, guidance of movement of the wheelchair is accomplished via a person standing directly behind the wheelchair.

Examples of prior art wheelchair devices which offer some variations on the above theme are as follows. U.S. Pat. No. 4,708,357 to Soderbaum, dated Nov. 24, 1987, discloses a wheelchair gripping modification in which a single grip steering device is connectable to the two conventional grips. U.S. Pat. No. 4,852,697 to Kulik, dated Aug. 1, 1989, discloses a brake mechanism connected to each of the wheelchair grips, where each hand-brake control actuates against the rim of its adjacent rear wheel. U.S. Pat. No. 4,415,202 to Pew, dated Nov. 15, 1983, discloses a wheelchair having an auxiliary seat for assisting a disabled person to be seated therein; the auxiliary seat operates via hand levers. U.S. Pat. No. 4,865,344 to Romero, Sr. et al., dated Sep. 12, 1989, discloses a wheelchair equipped with a handle movable by the disabled occupant so as to effect movement of the wheelchair via forced rotation of the rear wheels. Finally, U.S. Pat. No. 3,953,054 to Udden et al, dated Apr. 27, 1976, discloses a wheelchair having a handle to assist an invalid into and out of the seat, as well as two pairs of castor wheels which alternate in operation as necessary for the invalid to effect steerage, where the wheelchair is either hand or motor operated.

While wheelchairs have been in existence for a long period of time, there exists no alternative but for the person guiding the wheelchair to walk behind the seat of the disabled person because, whatever grip mechanism is employed, it is always located behind the seat of the wheelchair. This is an unfortunate state of affairs, because it creates an unnatural and strained relationship between the disabled person in the wheelchair and his or her assistant who stands forlornly behind, neither person having the benefit of seeing facial expressions of the other as a conversation unfolds between them. Two conversing people never walk in a single file, they invariably walk side-by-side. Accordingly, what is needed is a wheelchair in which the person guiding the wheelchair can do so while walking side-by-side with the occupant of the wheelchair.

SUMMARY OF THE INVENTION

The present invention is a wheelchair guidance system that is connectable to a conventional wheelchair so as to permit the person guiding the wheelchair to stand beside the disabled person in the wheelchair as he or she guides movement of the wheelchair.

The wheelchair guidance system according to the present invention is composed of a handle-bar and a brake mechanism. The handle-bar is composed of three portions, a first portion which clamps to the frame of the wheelchair at the rear thereof, a second portion bent at 90 degrees to the first portion so as to generally follow along one of the armrests of the wheelchair, and a third portion which is bent at 90 degrees outwardly from the armrest so as to form a handle member that may be gripped by a person who guides movement of the wheelchair. The brake mechanism includes at least one hand-brake control provided on the third portion of the handle-bar so that the person guiding movement of the wheelchair can effect stopping of the wheelchair without difficulty.

It is preferred that the third portion of the handle-bar be pivotally connected to the second portion of the handle-bar, so that the third portion of the handle-bar may be unlocked from its normal position and then swung into adjacency with the armrest, should it be decided advantageous that the wheelchair be guided from the rear in a conventional manner, such as in the case of movement along a narrow hallway. It is further preferred that the brake mechanism include a brake actuator which is connected with the wheelchair frame and which actuates against the rim of the rear wheels of the wheelchair.

While the above description relates to the retrofitting of the present invention to an existing conventional wheelchair, alternatively, it is contemplated by the present invention that the wheelchair guidance system be incorporated integrally into a new wheelchair.

Accordingly, it is an object of the present invention to provide a wheelchair which is equipped so that the person guiding the wheelchair may do so while walking beside the person seated in the wheelchair.

It is an additional object of the present invention to provide a wheelchair which is equipped with a handle-bar extending from one side of the wheelchair, wherein the handle-bar allows the person guiding the wheelchair to guide movement of the wheelchair while walking beside the person seated in the wheelchair.

It is another object of the present invention to provide a wheelchair which is equipped with a handle-bar extending from one side of the wheelchair, wherein the handle-bar allows the person guiding the wheelchair to guide movement of the wheelchair while walking beside the person seated in the wheelchair, and further is equipped with a brake mechanism that ensures easy and sure stoppage of movement of the wheelchair from a control located at the handle-bar.

It is yet a further object of the present invention to provide a guidance system for a wheelchair which removably connects with a conventional wheelchair, the guidance system being composed of a handle-bar extending from one side of the wheelchair, wherein the handle-bar allows the person guiding the wheelchair to guide movement of the wheelchair while walking beside the person seated in the wheelchair, and further is composed of a brake mechanism that ensures easy and sure stoppage of movement of the wheelchair from a hand-brake control located at the handle-bar.

These, and additional objects, advantages, features and benefits of the present invention will become apparent from the following specification.

DETAILED DESCRIPTION OF THE PREFERRED EMBODIMENT

Figure 1:
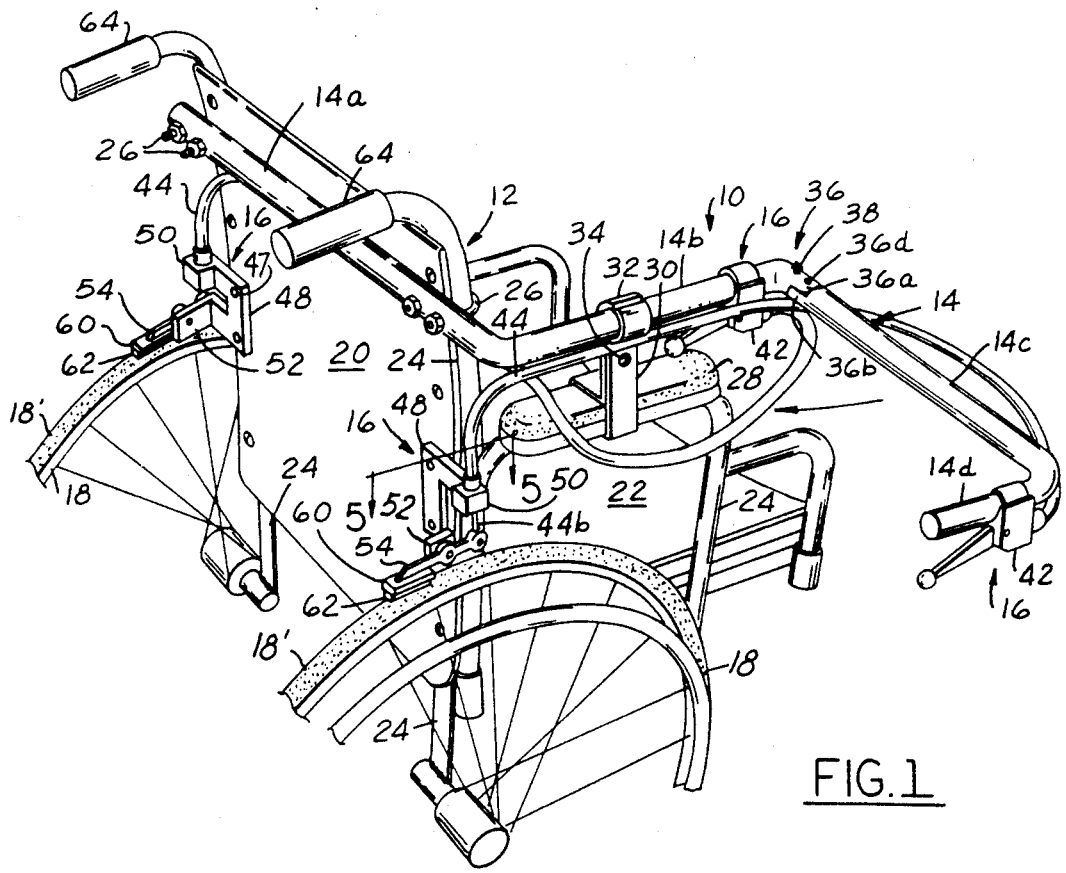
FIG. 1 is a perspective view from the rear of a wheelchair equipped with the wheelchair guidance system according to the present invention.
Figure 2:
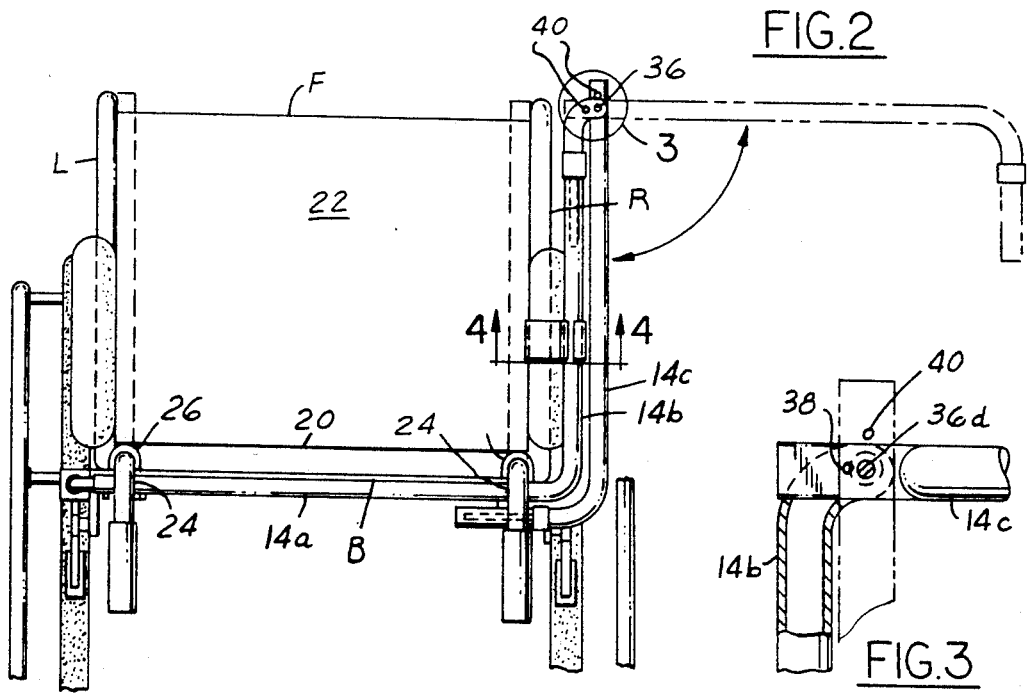
FIG. 2 is a plan view of the wheelchair equipped with the wheelchair guidance system of FIG. 1.

Referring now to the Drawing, FIG. 1 shows the wheelchair guidance system 10 according to the present invention in operation with a conventional wheelchair 12. As can be understood by reference to FIGS. 1 and 2, the wheelchair 12 has a frame 24, a seat 22 connected to the frame, a seat back 20 connected to the frame, armrests 28 connected to the frame, and a pair of rear wheels 18 connected to the frame. The seat 22 has a front F and rear B, and the wheelchair has a right side R and a left side L. As can be discerned from reference to the FIG. 1, the wheelchair guidance system 10 is composed of two major components: a handle-bar 14 of special shape, and a brake mechanism 16 which actuates with respect to the rear wheels 18 of the wheelchair 12.

Figure 4:
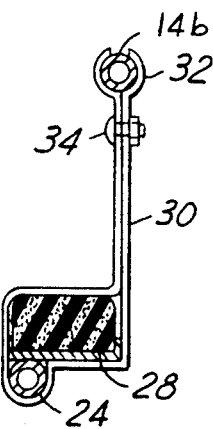
FIG. 4 is a partly sectional end view of the armrest mount of the wheelchair guidance system according to the present invention, seen along lines 4—4 in FIG. 2.

The handle-bar 14 is shaped so as to provide three portions. The first portion 14a of the handle-bar 14 runs horizontally along the seat back 20 of the wheelchair 12. It is preferred that the first portion 14a of the handle bar be connected in a releasable manner to an existing conventional wheelchair. Consequently, the first portion 14a of the handle-bar is preferred to be connected to the wheelchair frame 24 by use of "U" clamps 26 in a manner well known in the hardware art. The second portion 14b of the handle-bar 14 is integral with the first portion 14a, and is defined by a bend of ninety degrees relative to the first portion 14a and running alongside the wheelchair armrest 28 a distance approximately equal to the length of the seat 22 from the rear B to the front B. For purposes of added stability, a brace member 30 is provided to secure the handle-bar 14 with respect to the wheelchair 12 at the armrest 28. As can be seen by reference to FIG. 4, the brace member 30 is shaped to fit around both the armrest 28 and the portion of the wheelchair frame 24 to which the armrest attaches, and then extends upwardly from the armrest and terminates in a clamp 32 which clamps a section of the second portion 14b of the handle-bar. A bolt 34 regulates the clamping action, so that release of the bolt permits detachment of the second portion 14b of the handle-bar from the wheelchair, should dismantling of the wheelchair guidance system 10 be desired. The third portion 14c of the handle-bar 14 is connected to the second portion 14b, and is generally defined by a bend of ninety degrees relative to the second portion 14b so as to be oriented parallel with the first portion 14a, and further so as to be oriented to extend normal from the frame 24 adjacent the front F of the seat, in a plane parallel with the seat, a distance sufficient to allow a person in charge of guiding the wheelchair to comfortably grab the third portion 14c of the handle-bar using both hands, a distance on the approximate order of twenty inches or so.

Figure 3:
FIG. 3 is a detail partly sectional view of the hinge mount of a third portion of a handle-bar which forms a part of the wheelchair guidance system according to the present invention, as seen according to circle 3 in FIG. 2.

It is preferred that at the connection of the third portion 14c of the handle-bar to the second portion 14b be pivotal. As can be understood by reference to FIGS. 2 and 3, the third portion 14c of the handle-bar is not integral with the first and second portions 14a and 14b, but rather is a separate piece. A hinge 36 is structured of two cooperatively interacting semi-circular cross-sections, one 36a is formed of the second portion 14b of the handle-bar and includes the bend, the other 36b is formed at the inboard end of the third portion 14c of the handle-bar. Each semi-circular cross-section is provided with a first aperture 36c, each of which being mutually aligned and through each of which extends a hinge pin 36. The semi-circular cross-sections are cut so that the third portion 14c of the handle-bar may pivot toward and away from the armrest in a horizontal plane parallel with that of the seat. In order that the third portion 14c of the handle-bar be selectively immovable with respect the the wheelchair 12, it is preferred to include a set-pin 38 which is insertable into a second aperture 40 in each of semi-circular cross-sections. These second apertures 40 align when the third portion 14c of the handle-bar is pivoted into its ninety degree angle with respect to the second portion 14b, and the set-pin extends therethrough so as to prevent pivotal movement of the third portion 14c of the handle-bar; removal of the set-pin permits pivotal movement. When pivoted, the third portion 14c of the handle-bar is swung into adjacency with the armrest 28, and is completely out of the way for conventionally guided operation of the wheelchair 12 using grips 64, such as in situations involving narrow hallways.

It is further preferred that an outboard end portion 14d of the handle-bar be integrally connected with the third portion 14c, and oriented at ninety degrees relative thereto in a plane parallel with respect to the seat 22. The purpose of the outboard end portion 14d is to assist steering of the wheelchair by the person charged with guiding movement of the wheelchair 12.

Figure 5:
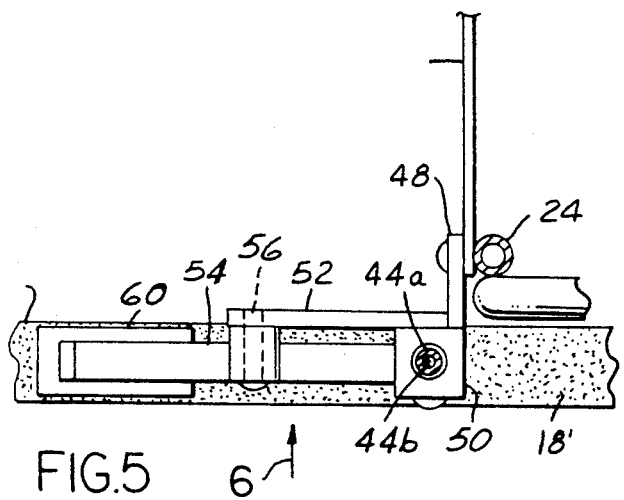
FIG. 5 is a partly sectional plan view of the brake actuator of the wheelchair guidance system according to the present invention, seen along lines 5—5 in FIG. 1.
Figure 6:
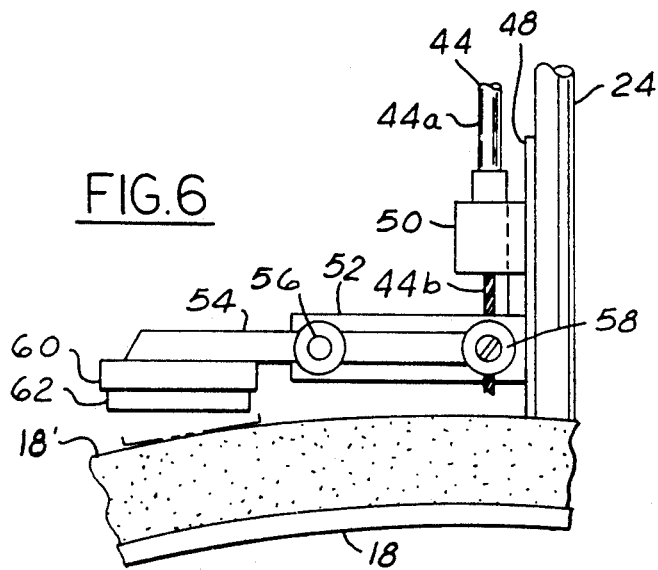
FIG. 6 is a detail side view of the brake actuator of the wheelchair guidance system according to the present invention, seen along lines 6 in FIG. 5, showing the interaction thereof with a wheelchair wheel.

The hand-brake mechanism 16 is composed of preferably two hand-brake controls 42 of the type well known in the brake art, particularly as related to bicycles. A linkage 44 of conventional construction employing a sheath 44a surrounding an axially slidable cable 44b, connects a hand-brake control 42 to a respective brake actuator 46. As can be elucidated by reference to FIGS. 5 and 6, each brake actuator 46 is composed of a mounting bracket 48 which is secured to the wheelchair frame 24 adjacent the seat back 20 preferably by a releasable fastener, such as bolts 47, so that the mounting bracket can be detached from the frame in the event it is desired to remove the present invention from the wheelchair 12, a linkage block 50 which connects the sheath 44a of the linkage 44 to the mounting bracket 48, a base 52 connected to the mounting bracket 48, a brake lever 54 connected by a pivot 56 to the base 52 at a central location of the brake lever, where the brake lever is connected at one end, via an adjustable connector 58, to the cable 44b of the linkage 44, and at the other end to a brake shoe 60 with brake pad 62. The brake mechanism 16 is structured so that as the person guiding the wheelchair grips either or both of the hand-brake controls 42, the linkage 44 will pull upon the brake lever 54, causing it to rotate about the pivot 56 and thereupon effect contact between the brake pad and the rim 18' of the rear wheels 18, thereby effecting to stop unwanted further rotation of the wheels.

In operation, the disabled person sits in the wheelchair 12 in a normal manner. If not done already, the third portion 14c of the handle-bar 14 is pivoted outwardly from adjacency with the armrest 28 so as to be parallel with respect to the seat back 20. The set-pin is then put through aligned second apertures 40 so as to lock the third portion 14c in position. The operator who will guide movement of the wheelchair 12 now stands behind the third portion 14c of the handle-bar and grasps the third portion 14c of the handle-bar in a comfortable manner, preferably with one or both hands on the hand-brake controls 42 so as to be ready for any untoward situation that may develop. The operator now pushes the wheelchair forwardly, backwardly or in any other direction as desired. Once the wheelchair is in motion, the person guiding the wheelchair may stop it by providing force to the third potion 14c of the handle bar, or by simply pressing the hand-brake controls 42. All the while, the disabled person will be happily advantaged by being able to see the operator, and vice versa, during their time together in a manner not unlike two persons walking together.

When finished, the operator may remove the set-pin and then pivot the third portion 14c of the handle-bar into adjacency with the armrest. Now the wheelchair 12 may be easily stowed away or used in the conventional manner of pushing and pulling on the conventional grips 64.

While the above description relates in particular to a structure for being retrofitted onto existing conventional wheelchairs, it is within the contemplation of the present invention to incorporate the wheelchair guidance system 10 into the structure of newly manufactured wheelchairs.

To those skilled in the art to which this invention appertains, the above described preferred embodiment may be subject to change or modification. For instance, only one hand-brake control may be utilized with two linkages emanating therefrom to interconnect with the two brake actuators. Further for instance, either of the hand-brake controls may simultaneously effect operation of both the brake actuators. And, for reasons of economy among others, it is possible to construct the wheelchair guidance system according to the present invention without pivotal movement of the third portion of the handle-bar, and/or without the hand-brake machanism (although inclusion of the hand-brake mechanism is preferred for safety reasons). Also, while the third portion 14c of the handle bar is shown on the right side of the wheelchair, it could as easily be located at the left side thereof. Such changes or modifications can be carried out without departing from the scope of the invention, which is intended to be limited only by the scope of the appended claims.

What is claimed is:

1. A guidance system for being connected to a wheelchair, the wheelchair having a right side and a left side, the wheelchair further having a frame, a seat connected to the frame, a seat back connected to the frame, and a rear wheel connected with the frame at each of the right and left sides of the wheelchair, wherein the seat has a front end, further wherein the seat has a rear end whereat is located the seat back, and further wherein the seat defines a horizontal plane and the front end of the seat defines a horizontal axis, said guidance system comprising:

a handle-bar; and means for releasably connecting said handle-bar to the frame of the wheelchair so that at least a portion of said handle-bar extends from one of said right and left side of said wheelchair in an orientation substantially normal to the frame of the wheelchair in a direction substantially parallel with respect to the horizontal axis and in a plane substantially parallel with respect to the horizontal plane, at a location substantially adjacent the front end of the seat;

wherein the wheelchair may be movably guided by a person grasping said handle-bar while the person is located beside the seat at said one of said right side and said left side of the wheelchair.

2. The guidance system of claim 1, further comprising brake means connected with said handle-bar and releasably connectable with the frame of the wheelchair for selectively stopping rotation of the rear wheels thereof.

3. The guidance system of claim 2, wherein said brake means comprises:

brake actuator means connectable with respect to the wheelchair adjacent each said rear wheel for selectively interacting with said rear wheels for causing said rear wheels to stop rotating; and hand-brake control means connected with said handle-bar for selectively actuating said brake actuator means.

4. The guidance system of claim 2, further comprising hinge means connected with said handle-bar for effecting pivotal movement of said at least a portion of said handle-bar in said plane substantially parallel with respect to the horizontal plane.

5. The guidance system of claim 4, wherein said hinge means further comprises stop means connected with said handle-bar for selectively preventing said at least a portion of said handle-bar from pivoting at said hinge means.

6. The guidance system of claim 3, wherein said handle-bar comprises:

a first portion connectable to the frame of the wheelchair adjacent the seat back;

a second portion integrally connected with said first portion, said second portion being oriented at substantially ninety degrees with respect to said first portion, said second portion being oriented along one of said left and right sides of the wheelchair, said second portion being connectable to the frame of the wheelchair; and a third portion connected with said second portion, said third portion being oriented at substantially ninety degrees with respect to said second portion, said third portion extending from said one of said right and left sides of said wheelchair in an orientation substantially normal to the frame of the wheelchair in a plane substantially parallel with respect to the horizontal plane, at a location substantially adjacent the front end of the seat.

7. The guidance system of claim 6, wherein said handle-bar further comprises a fourth portion, said fourth portion being oriented at substantially ninety degrees with respect to said third portion in said plane substantially parallel with respect to the horizontal plane and in a direction toward the rear end of the seat.

8. The guidance system of claim 6, further comprising hinge means connected with said handle-bar for effecting pivotal movement of said third portion with respect to said second portion in said plane substantially parallel with respect to the horizontal plane.

9. The guidance system of claim 8, wherein said hinge means further comprises stop means connected with said handle-bar for selectively preventing said third portion of said handle-bar from pivoting at said hinge means.

10. A wheelchair having a left side and a right side, said wheelchair comprising:
   a frame;
   a seat connected to the frame, said seat having a front end and a rear end, said seat defining a horizontal plane, said front end of said seat defining a horizontal axis;
   a rear wheel connected with the frame at each of the right and left sides of the wheelchair;
   a handle-bar; and
   means for connecting said handle-bar to said frame so that at least a portion of said handle bar extends from one of said right and left side of said wheelchair in an orientation substantially normal to said frame in a plane substantially parallel with respect to said horizontal plane and substantially parallel with respect to said horizontal axis, at a location substantially adjacent said front end of said seat;
   wherein the wheelchair may be movably guided by a person grasping said handle-bar while the person is located beside said seat at said one of said right side and said left side of the wheelchair.

11. The wheelchair of claim 10, further comprising brake means connected with said handle-bar and connected with said frame for selectively stopping rotation of the rear wheels thereof.

12. The wheelchair of claim 11, wherein said brake means comprises:
   brake actuator means connected to said frame adjacent each said rear wheel for selectively interacting with said rear wheels for causing said rear wheels to stop rotating; and
   hand-brake control means connected with said handle-bar for selectively actuating said brake actuator means.

13. The wheelchair of claim 12, further comprising hinge means connected with said handle-bar for effecting pivotal movement of said handle-bar in said plane substantially parallel with respect to said horizontal plane.

14. The wheelchair of claim 13, wherein said hinge means further comprises stop means connected with said handle-bar for selectively preventing said handle-bar from pivoting at said hinge means.

15. The wheelchair of claim 12, wherein said handle-bar comprises:
   a first portion connectable to the frame of the wheelchair adjacent said seat back;
   a second portion integrally connected with said first portion, said second portion being oriented at substantially ninety degrees with respect to said first portion, said second portion being oriented along one of said left and right sides of the wheelchair, said second portion being connected to said frame of the wheelchair;
   a third portion connected with said second portion, said third portion being oriented at substantially ninety degrees with respect to said second portion, said third portion extending from said one of said right and left sides of said wheelchair in an orientation substantially normal to said frame of the wheelchair in said plane substantially parallel with respect to said horizontal plane at a location substantially adjacent said front end of said seat.

16. The wheelchair of claim 15, wherein said handle-bar further comprises a fourth portion, said fourth portion being oriented at substantially ninety degrees with respect to said third portion in said plane substantially parallel with respect to said horizontal plane and in a direction toward said rear end of said seat.

17. The wheelchair of claim 15, further comprising hinge means connected with said handle-bar for effecting pivotal movement of said third portion with respect to said second portion in said plane substantially parallel with respect to said horizontal plane.

18. The wheelchair of claim 17, wherein said hinge means further comprises stop means connected with said handle-bar for selectively preventing said third portion of said handle-bar from pivoting at said hinge means.

* * * * *